United States Patent [19]

Schröder

[11] 4,347,916
[45] Sep. 7, 1982

[54] ROLL GUIDE SHOE FOR ELEVATORS OR THE LIKE

[75] Inventor: Joris Schröder, Lucerne, Switzerland

[73] Assignee: Inventio AG, Hergiswil, Switzerland

[21] Appl. No.: 210,005

[22] Filed: Nov. 24, 1980

[30] Foreign Application Priority Data

Dec. 11, 1979 [CH] Switzerland ............... 10964/79

[51] Int. Cl.³ .................................... B66B 7/02
[52] U.S. Cl. ........................... 187/95; 308/3 B
[58] Field of Search ............... 187/95, 9 R; 308/3 R, 308/3 B, 1 R, 3 A, 6 R, 3.8; 182/141, 142, 36, 37, 38

[56] References Cited

U.S. PATENT DOCUMENTS 1,667,547  4/1928  Green ........................... 187/95
2,260,922 10/1941  Spiro ............................. 187/95

FOREIGN PATENT DOCUMENTS 54-144645 11/1979  Japan ........................... 187/95
773122  9/1955  United Kingdom ............ 308/3.8

Primary Examiner—F. J. Bartuska
Assistant Examiner—Kenneth Noland
Attorney, Agent, or Firm—Werner W. Kleeman

[57] ABSTRACT

Rotatably mounted rolls arranged behind one another in a support or carrier element of a roll guide shoe posess different diameters. In this way it is possible to reduce to a minimum the unquiet or jerky travel of a moved, guided portion of the elevator which is caused by flattening of the rolls as a result of longer standstill times of the roll guide shoe.

1 Claim, 6 Drawing Figures

ROLL GUIDE SHOE FOR ELEVATORS OR THE LIKE

BACKGROUND OF THE INVENTION

The present invention relates to a new and improved construction of a roll or roller guide shoe for elevators or the like.

Generally speaking, the roll guide shoe of the present development is of the type comprising a plurality of travelling rolls which bear upon at least one guide surface of a guide rail and are arranged behind one another in the direction of elevator travel. The travelling rolls are rotatably mounted in at least one support or carrier element pivotably connected with a movable part of the elevator.

For the guiding of movable elevator parts, such as, for instance, elevator cabins and counterweights along guide rails, there have already been employed, as is well known in this technology, so-called slide or roll guide shoes. Roll guide shoes are particularly advantageous because the friction of the rolls in the static condition is only slightly greater than the rolling friction, and therefore, during transition of the movable elevator part from its stationary state into a mobile state it is possible to reduce to a minimum the arising jerky start-up movements.

According to a state-of-the-art roll guide shoe according to German Pat. No. 2,433,960 there are provided three roll pairs of the same construction. Each of the roll pairs bear upon one of three guide rail sides and each are pivotably mounted at a support or carrier element connected with the movable elevator part. Due to this arrangement there is imparted to the roll guide shoe the possibility of extensively compensating for irregularities, discontinuities and gaps at the rail joints in the guide rails, and thus, to reduce impacts and lateral movements of the movable elevator part.

An appreciable drawback of the roll guide shoe however resides in the fact that the rolls, which possess travelling surfaces which are elastic throughout certain limits, upon longer standstill of the movable elevator part, have imparted thereto at their contact locations with the guide rail at the roll circumference relatively pronounced flattened portions which are retained during further elevator travel over a longer period of time. These flattened portions cause an unquiet, jerky travel of the movable elevator part. This effect has found to be particularly disadvantageous in the case of so-called load frame elevators or lifts wherein the elevator cabin is suspended eccentrically and moves along guide rails arranged only at one side thereof. With this arrangement not only when the elevator cabin is loaded but also when it is empty are there transmitted relatively large forces by means of the roll guide shoe to the guide rails.

SUMMARY OF THE INVENTION

Therefore, with the foregoing in mind it is a primary object of the present invention to provide a new and improved construction of a roll guide shoe for elevators or the like which is not associated with the aforementioned drawbacks and limitations of the prior art constructions.

Another and more specific object of the present invention aims at providing a new and improved construction of a roll guide shoe wherein the unquiet travel of the movable elevator part, caused by the formation of the flattened portions at the circumference of the travelling rolls, can be reduced to a minimum.

Now in order to implement these and still further objects of the invention, which will become more readily apparent as the description proceeds, the roll guide shoe for elevators or the like according to the present development is manifested by the features that the travelling rolls of at least one support or carrier element have different diameters.

According to another preferred construction of the invention four travelling rolls arranged in pairs behind one another in the direction of travel of the movable elevator part have different diameters, and each pair of travelling rolls is operatively associated with a support or carrier body and the support body is pivotably connected with a yoke and this yoke is pivotably connected with a movable elevator part.

DETAILED DESCRIPTION OF THE PREFERRED EMBODIMENTS

Figure 1:
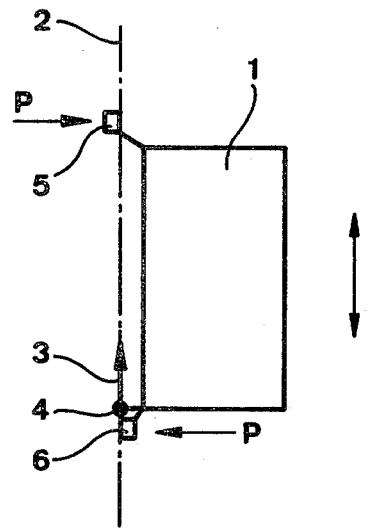
FIG. 1 is a schematic side view of a prior art arrangement.
Figure 2:
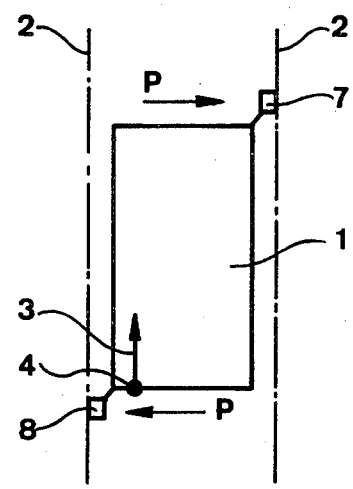
FIG. 2 is a schematic front view, again of the arrangement of FIG. 1, and specifically showing the guide and support of the elevator cabin of a so-called load frame elevator having two guide rails arranged at a single side.

Describing now the drawings, in FIGS. 1 and 2 reference character 1 designates the elevator cabin of a load frame elevator or the like which is guided by means of two parallel guide rails 2 behind the elevator cabin 1 and attached internally of a not further illustrated elevator shaft or chute. Reference character 3 designates a conveying cable which can be moved in conventional fashion by a likewise not particularly illustrated standard elevator drive, the elevator cabin 1 being suspended at the conveying or drive cable 3. Reference character 4 designates the attachment point of the conveying cable 3 at the lower portion of the frame of the elevator cabin 1. Reference characters 5 and 6 designate two respective guide shoes, reference characters 7 and 8 a respective guide shoe which serves to guide and support the elevator cabin 1 at both of the guide rails 2. The forces which arise with this arrangement from the guide rails 2, guide shoes 5, 6, 7, 8 and conveying cable-attachment point 4 are indicated by the arrows P. These forces are already relatively great even when the elevator cabin 1 is empty and increase when the elevator cabin 1 is loaded. When using roll guide shoes it must be taken into account that the travelling rolls are oblated or flattened at their circumference during longer periods of standstill of the elevator.

Figure 3:
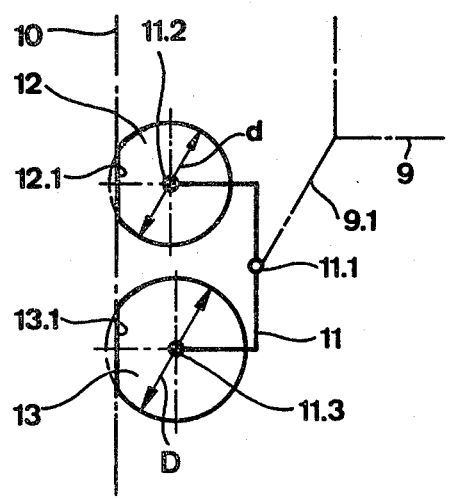
FIG. 3 is a schematic view of a roll guide shoe for movable elevator parts according to a first exemplary embodiment of the invention.
Figure 4:
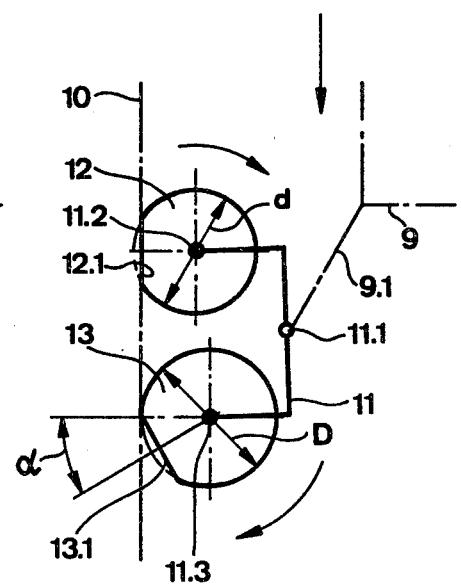
FIG. 4 illustrates the roll guide shoe of FIG. 3 in a different position of the movable elevator part.

The exemplary embodiment of invention roll guide shoe schematically illustrated in FIGS. 3 and 4 serves for guiding and supporting a movable elevator part 9 at a guide rail 10. It essentially consists of a support or carrier body 11, at both of whose ends there are rotatably mounted upon the shafts 11.2 and 11.3 a respective travelling roller or roll 12 and 13. Both of the travelling rolls 12 and 13 of the support or carrier body 11 have mutually different diameters d and D respectively. Support or carrier body 11 is pivotably mounted at its center 11.1 in the direction of the guide rail 10 at an arm 9.1 which is attached to the movable elevator part 9.

If the load formed by the movable elevator part 9 exerts a relatively large pressure force, by means of the travelling rolls 12 and 13 upon the guide rail 10, as such for instance is the case for the elevator cabin 1 of the elevator equipment illustrated in FIGS. 1 and 2, then both of the travelling rolls 12 and 13 have imparted thereto an oblating action so as to form the roll flattened portions 12.1 and 13.1 at the roll circumferential portion contacting the guide rail 10. When the movable elevator part 9 remains stationary over a longer period of time then the compression or pressure force is continuously taken-up by the same part 12.1 and 13.1 (FIG. 3) of the circumference of the travelling roll 12 and 13, respectively. Consequently, even upon further travel of the movable elevator part 9, there results a flattened portion or flattening of the rolls which remains present over a longer period of time, i.e. there occurs a plastic deformation of the material of the travelling rolls 12 and 13. During further travel of the movable elevator part 9, during each revolution of a guide roll 12 and 13, there occurs a bumping or uneven running action until that point in time as there has been at least partially reestablished the normal condition of the roll circumference of the related guide or travelling roll. Due to the different diameters of the travelling rolls 12 and 13, as contemplated by the present invention, the deformed portion 12.1 of the circumference of the small travelling roll 12, during the course of the movement of the movable elevator part 9, always come to bear at the guide rail 10 before contact of the deformed portion 13.1 of the larger size travelling roll 13, i.e. during a complete revolution of the smaller travelling roll 12 the large travelling roll 13 only rotates through an angle of rotation of $360° - \alpha$, wherein the angle $\alpha$ is dependent upon the difference in the diameters of the travelling rolls 12 and 13.

Therefore, at the point in time of again placing into operation the movable elevator part 9, for instance the elevator cabin, during a relatively large number of revolutions, particularly when there are present small diameter differences between the rolls 12 and 13, a non-deformed roll part of at least one of the travelling rolls 12 or 13 always contact the guide rail 10. Since the support or carrier body 11 is pivotably connected at its central portion or region 11.1 with the movable elevator part 9, both of the travelling rolls 12 or 13 continuously bear against the guide rails 10. During each contact of a deformed part 12.1 or 13.1 at the guide rail 10 to support or carrier body 11 carries out a pivotal movement about its point of rotation. Consequently, the bumpy or jerky effect which can be ascertained by virtue of the movable elevator part 9 is reduced each time by one-half.

Figure 5:
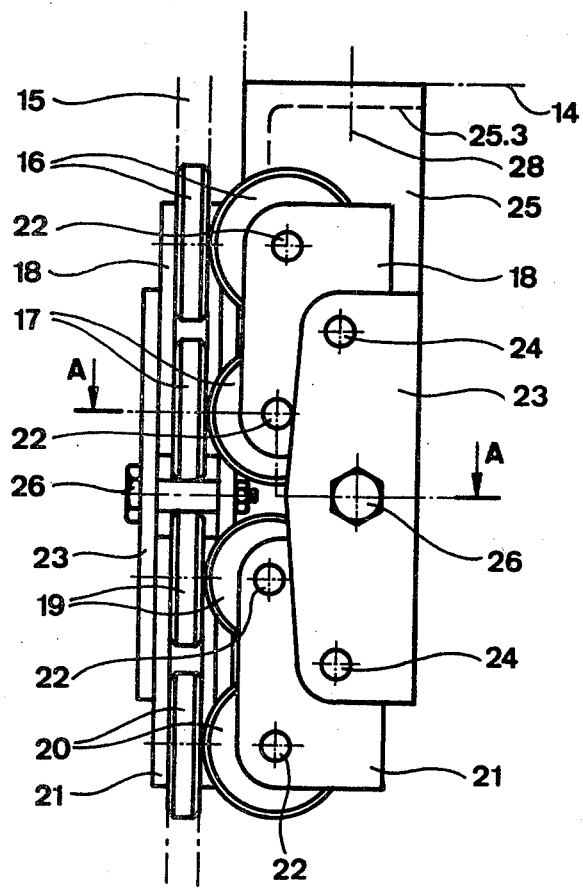
FIG. 5 is a simplified side view of a roll guide shoe according to a second embodiment of the invention.
Figure 6:
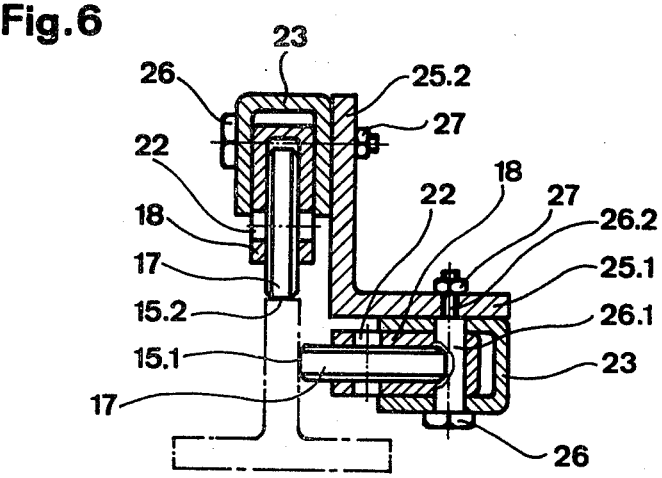
FIG. 6 is a cross sectional view of the roll guide shoe of FIG. 5, taken substantially along the line A—A thereof.

According to the preferred embodiment of inventive roll guide shoe as illustrated in FIGS. 5 and 6 there is accomplished the guiding of a movable elevator part 14 along two guide surfaces 15.1 and 15.2 of a guide rail 15, these guide surfaces 15.1 and 15.2 being arranged essentially at right angles with respect to one another. The roll guide shoe possesses for each guide surface 15.1 or 15.2 a set of four travelling rolls 16, 17, 19, 20 arranged behind one another and having slight diameter differences with respect to one another. Both of the sets of travelling rolls are identical. In each set there are arranged in pairs four travelling rolls 16, 17, 19, 20. Each pair of travelling rolls 16, 17 and 19, 20, respectively, is rotatably mounted in a substantially U-shaped support or carrier body 18 and 21, respectively, between the legs thereof by means of the shafts or pins 22 or equivalent structure. For each travelling roll set both of the support bodies 18 and 21 are pivotably mounted between the legs of a likewise U-shaped yoke 23 at the ends thereof by means of the shafts 24. Each yoke 23 is pivotably mounted at one of two arms 25.1 and 25.2 of an angle-shaped connection element 25. For this purpose there is provided in a not particularly referenced bore at both legs of each U-shaped yoke 23 the support bodies 18 and 21 at the same spacing from both pivot shafts 24. Within the bore there is provided the cylindrical body or portion 26.1 of a fitting threaded bolt or screw 26, the threaded shaft portion 26.2 of which is guided within a bore provided at the related arm 25.1 and 25.2, respectively, of the angle-shaped connection element 25 and is secured by means of a nut member 27 or equivalent structure at the connection element 25. The connection element 25 is provided at one of its ends with a contact plate 25.3, by means of which the roll guide shoe can be attached by threaded bolts or screws 28 or the like at the movable elevator part 14.

Due to this embodiment the bumpy or jerking effect arising at the movable elevator part 14 during the rotation of the flattened travelling rolls 16, 17, 19, 20 is reduced to one-quarter. Such type roll guide shoe therefore has been found to be advantageous during the guiding of elevator cabins, especially the cabins of load frame elevators.

It should be readily apparent that within the teachings of the invention it would be possible to provide other embodiments of the roll guide shoe. The support body or bodies 18, 21 as well as, if desired, the yoke or yokes 23, could be designed for instance instead of being U-shaped in configuration, as pivotable flat support elements at which there are laterally mounted the travelling rolls and support body. Equally, the support body or bodies 18, 21, or, if desired, the yoke or yokes 23 could be directly connected with the movable elevator part or by means of other expedients or devices than illustrated. On the other hand, in order to enable the simultaneous guiding of the movable elevator part along a number of guide surfaces of the guide rail it would be possible to also equip the roll guide shoe with an additional travelling roll set constructed according to the invention.

While there are shown and described present preferred embodiments of the invention, it is to be distinctly understood that the invention is not limited thereto, but may be otherwise variously embodied and practiced within the scope of the following claims. Accordingly,

What I claim is:

1. A roll guide shoe for elevators comprising:
    a plurality of travelling rolls arranged behind one another in the direction of travel of the elevator and adapted to bear against at least one guide surface of a guide rail;
    at least one support element adapted to be pivotably connected with a movable part of the elevator;

means for rotatably mounting said travelling rolls in said support element;

said travelling rolls of said at least one support element possessing different diameters with respect to one another;

said plurality of travelling rolls comprise four travelling rolls arranged in pairs behind one another in the direction of travel of the elevator part;

each of the pair of travelling rolls having different diameters;

each pair of travelling rolls being operatively associated with a respective support body of a related support element;

yoke means with which there is pivotably connected each related support element; and said yoke means being pivotably connected with the movable elevator part.

* * * * *